United States Patent
Olshenske et al.

(10) Patent No.: US 11,993,468 B2
(45) Date of Patent: May 28, 2024

(54) AUTOMATED PACKING CART

(71) Applicant: Four Growers, Inc., Turtle Creek, PA (US)

(72) Inventors: Zachary Olshenske, North Huntingdon, PA (US); Robert Rudolph, Sunnyvale, CA (US); James Darr, Pittsburgh, PA (US); Yun Nuo Chi, Pittsburgh, PA (US)

(73) Assignee: Four Growers, Inc., Pittsburgh, PA (US)

( * ) Notice: Subject to any disclaimer, the term of this patent is extended or adjusted under 35 U.S.C. 154(b) by 805 days.

(21) Appl. No.: 17/064,872

(22) Filed: Oct. 7, 2020

(65) Prior Publication Data

US 2021/0101764 A1 Apr. 8, 2021

Related U.S. Application Data

(60) Provisional application No. 62/911,500, filed on Oct. 7, 2019.

(51) Int. Cl.
*B65G 61/00* (2006.01)
*B25J 9/02* (2006.01)
(Continued)

(52) U.S. Cl.
CPC .............. *B65G 61/00* (2013.01); *B25J 9/026* (2013.01); *B25J 13/088* (2013.01); *B25J 15/026* (2013.01);
(Continued)

(58) Field of Classification Search
CPC .... B65G 1/00; B65G 1/1375; B65G 2209/06; B65G 2201/0202; B65G 2201/0258;
(Continued)

(56) References Cited

U.S. PATENT DOCUMENTS 4,492,504 A * 1/1985 Hainsworth .............. B66F 9/07
414/280
5,102,283 A * 4/1992 Balzola Elorza .... B65G 47/912
414/404

(Continued)

FOREIGN PATENT DOCUMENTS

DE 19540855 A1 5/1997
GB 2095215 A 9/1982
WO 2019137870 A1 7/2019

OTHER PUBLICATIONS

International Search Report and Written Opinion of the International Searching Authority for PCT/US2020/054539, dated Jan. 5, 2021 (9 pages).

*Primary Examiner* — Glenn F Myers
(74) *Attorney, Agent, or Firm* — Buchanan Ingersoll & Rooney PC

(57) ABSTRACT

Embodiments relate to a cart assembly having a lower deck, an upper deck, and a gantry. The lower deck has designated areas for empty containers and for filled containers. The gantry includes a gripper system configured to grab at least one container from the empty-container staging area and transport it to a receiving site, where a crop harvesting apparatus deposits a crop in the container. Once the container is filled, the gantry moves the filled container so as to position it within a filled-container staging area of the lower deck. The gripper system then releases the container. The process is continued while the cart assembly is transported throughout a crop harvesting facility to harvest crops.

20 Claims, 12 Drawing Sheets

(51) Int. Cl.
  *B25J 13/08* (2006.01)
  *B25J 15/02* (2006.01)
  *B65B 43/46* (2006.01)
  *B65B 57/12* (2006.01)
  *A01D 46/30* (2006.01)
  *B60B 17/00* (2006.01)

(52) U.S. Cl.
  CPC ............. *B65B 43/46* (2013.01); *B65B 57/12* (2013.01); *A01D 46/30* (2013.01); *B60B 17/00* (2013.01); *B65G 2201/0202* (2013.01); *B65G 2203/0258* (2013.01)

(58) Field of Classification Search
  CPC .......... B65G 2203/0258; B65G 47/901; B65G 41/008; B25J 9/026; B25J 13/088; B25J 13/089; B25J 15/026; B25J 15/0253; B25J 5/007; B65B 43/46; B65B 57/12; B65B 57/20; A01D 46/30; B60B 17/00
  USPC ......................................... 414/496, 342, 343
  See application file for complete search history.

(56) References Cited

U.S. PATENT DOCUMENTS

| | | | | |
|---|---|---|---|---|
| 6,732,962 | B1* | 5/2004 | Butler | ..................... B02C 18/24 241/285.2 |
| 11,343,967 | B1* | 5/2022 | Freeman | ............. B25J 15/0019 |
| 2005/0220600 | A1 | 10/2005 | Baker et al. | |
| 2007/0248448 | A1 | 10/2007 | Starz | |
| 2017/0066592 | A1* | 3/2017 | Bastian, II | ............... B25J 5/007 |
| 2017/0341786 | A1* | 11/2017 | Zacche' | .................... B65B 1/14 |
| 2018/0319590 | A1 | 11/2018 | Lindbo et al. | |

* cited by examiner

AUTOMATED PACKING CART

CROSS-REFERENCE TO RELATED APPLICATIONS

This patent application is related to and claims the benefit of U.S. Provisional Patent Application No. 62/911,500, filed on Oct. 7, 2019, the entire contents of which are incorporated herein by reference in their entirety.

FIELD OF THE INVENTION

Embodiments relate to a cart assembly having a lower deck, and upper deck, and a gantry, wherein the lower deck has designated areas for empty containers and for filled containers. The gantry includes a gripper system configured to grab at least one container from the empty-container staging area and transport it to a receiving site, where a crop harvesting apparatus deposits a crop in the container. Once the container is filled, the gantry moves the filled container so as to position it in a filled-container staging area of the lower deck.

BACKGROUND OF THE INVENTION

While advancements have been made in the ability to robotically pick produce, and other objects, there still exists a shortcoming in those systems as to what to do with the gathered items. Currently, items gathered are either stored in large hoppers or must be frequently unloaded by humans. Storing items in large hoppers can lead to adverse effects on produce, or similar soft goods, as the product can become damaged under the weight of the gross product above it. Human interaction is also undesirable as it limits the throughput of the robotic harvesters and is a roadblock to these units becoming cost effective. In addition to the above deficiencies, the use of non-standard equipment and dedicated personnel to support these robotic harvesters can be taxing for existing traditional crop harvesting facilities (e.g., greenhouses) to integrate, thus further limiting their ability to expand usage.

The present invention is directed at overcoming one or more of the above-mentioned problems, although not necessarily limited to embodiments that do.

SUMMARY OF THE INVENTION

Embodiments relate to a cart assembly having a lower deck, an upper deck, and a gantry configured to form an automatic packing cart. The lower deck has designated areas for empty containers and for filled containers. The gantry includes a gripper system configured to grab at least one container from the empty-container staging area and transport it to a receiving site (or loading zone), where a crop harvesting apparatus deposits a crop or other object in the container. Once the container is filled, the gantry moves the filled container so as to position it within a filled-container staging area of the lower deck. The gripper system then releases the container. The process is automated via a control module and is continued while the cart assembly is transported throughout a crop harvesting facility to harvest crops. This process is referred to as the automated packing procedure for the system.

The automated packing feature of the cart assembly provides a mobile assembly line that replaces the traditional hand loaded and pushed carts found within crop harvesting facilities. It is a piece of companion equipment that supports a robotic picking system by moving and storing the picking system's gathered produce. It can also act as a traditional packing cart for non-robotic harvesting operations, but with the added feature of direct container weighing and manipulation. The system includes a combination of subsystems (described herein) developed to seamlessly integrate into existing production lines.

In order for robotic harvesters to become viable production solutions for end users, it is required to outperform the current used method, which is human centered picking. To date, harvesters have not solved the issue of storing and sorting produce. The cart assembly disclosed herein, however, is a first of its kind platform that can solve this limitation in existing systems. It is easy to integrate into existing production lines and requires little to no rework for crop harvesting facilities, such as greenhouses for example. The cart assembly can be configured to use industry standard packing crates as the container, which alleviates the need for additional material handling operations in the production process. These containers are used throughout produce greenhouses (or other crop harvesting facilities) as the primary receptacle for storing and moving the picked crops. By being able to use the same containers that are already in use, the inventive system does not require end-users to acquire items or adjust their automated post-harvesting operations.

As will be explained herein, the cart assembly can be configured to self-monitor its payload to trigger container change-outs and to ensure the crops placed within the containers are not being damaged during packing operations. For instance, the cart assembly can monitor crops being placed within each container by accurately weighing the amount of crops in the container as it is being loaded. The system can also adjust the position of the container while being loaded to help evenly distribute the harvested crop in the container. Both are done to minimize or negate damage to the harvested crop as the crop builds upon itself when being placed in the container. In addition, the system can help support human centered picking operations by using the weight-monitoring system to automatically move containers once full (as opposed to having human operators perform this task). In contrast, conventional methods and systems are limited to human observation and do not utilize actual measurements. In addition, conventional methods for moving containers are limited to having humans exchange full containers for empty ones. Thus, the cart assembly disclosed herein is an innovative system that supports robotic and human crop harvesters and enables them to expand into full production solutions.

It will be understood by one skilled in the art, with the benefit of the present disclosure, that embodiments of the cart assembly (or components thereof) can be used by groups and industries outside of crop harvesting, and thus is not limited for use with crop harvesting.

The automated packing cart system as described herein can be used throughout the produce harvesting industry were traditional packing crates and rolled cart processing is used. The system is adaptable to various grow house setups and can accommodate a wide variety of produce types. In addition to picking operations, the automated packing cart can be used in supplementary areas in the harvesting production line such as sorting, moving, cleaning, and packing operations. Beyond the harvesting industry, the automated packing cart can be used in industries where there exists a need to receive, monitor, and stack crates with goods inside.

In an exemplary embodiment, an automated packing cart assembly includes a cart having a lower deck, vertical supports, and an upper deck forming a space within which containers are held. The lower deck includes an empty-container staging area and a filled-container staging area. The assembly has a gantry secured to the upper deck, the gantry including a gripper system configured to releasably grab a container. The assembly has a control module configured to: cause the gripper system to retrieve the container from the empty-container staging area and transport it to a receiving site to receive an object in the container; determine when the container is filled; and transport the filled container to the filled-container staging area.

In some embodiments, the object is a crop.

In some embodiments, the assembly further includes a crop harvesting apparatus configured to retrieve crops from plants and direct them to the container that is within the receiving site.

In some embodiments, the assembly further includes wheels attached to the cart.

In some embodiments, the assembly further includes a means of propulsion.

In some embodiments, the wheels are flanged track wheels to facilitate motion of the cart assembly on rails or tracks placed on a ground or floor.

In some embodiments, the lower deck, the vertical supports, and the upper deck are constructed of connectable and adjustable subparts so as to allow dimensions of the cart assembly to be adjustable.

In some embodiments, the gantry includes a vertical motion servo and a horizontal motion servo, each in electro-mechanical association with the gripper system via the control module to cause the gripper system to move in a vertical motion and/or a horizontal motion.

In some embodiments, the control module is configured to actuate the vertical motion servo and/or the horizontal motion servo in a repeated manner to cause the gripper system to oscillate in a vertical and/or horizontal movement while the gripper system has a container and the container is positioned in the receiving site.

In some embodiments, the gripper system includes a first gripper arm and a second gripper arm, the first gripper arm and the second gripper arm being parallel to each other and configured to move towards and away from each other. The gripper system grabs a container by: the first griper arm and the second gripper arm being moved away from each other to generate a space between each other that is wider than a width of the container, thereby allowing the gripper system to envelope the container; and the first griper arm and the second gripper arm being moved towards each other until the first gripper arm and the second gripper arms secure the container between each other.

In some embodiments, the first gripper arm has a container grip, and the second gripper arm has a container grip.

In some embodiments, the gripper system includes a load cell configured to measure the weight of the container when the container is grabbed by the gripper system and hoisted so as to be suspended by the gripper system.

In some embodiments, the gripper system includes a positon sensor to assess the position of the gripper system and/or the first and second gripper arms relative to the container.

In some embodiments, the control module is programmed to execute a homing procedure, in which, upon the automated packing cart assembly experiencing a reset, a system fault, or is powered-on after being powered-off, each of the vertical motion servo and the horizontal motion servo is moved to an initializing point.

In some embodiments, the initializing point is the receiving site.

In some embodiments, the homing procedure includes, as the initializing point, the first griper arm and the second gripper arm being moved away from each other to generate a space between each other that is wider than a width of the container.

In some embodiments, the gripper system includes a positon sensor to determine a vertical position and/or a horizontal position of the griper system relative to the lower deck and/or the upper deck.

In some embodiments, the control module is programmed to execute a weighing procedure that assesses the weight measured by the load cell to determine whether enough objects have been received by the container, and designates the container as filled based on the assessment.

In some embodiments, the weighing procedure uses a threshold weight value that, when reached, causes the control module to designate the container as being filled.

In some embodiments, the threshold weight value for one type of object differs from the threshold weight for another type of object.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present invention will be more apparent from the following more particular description thereof, presented in conjunction with the following drawings, in which:

FIG. 8B is a continuation of the flow diagram presented n FIG. 8A.

DETAILED DESCRIPTION OF THE INVENTION

Figure 1:
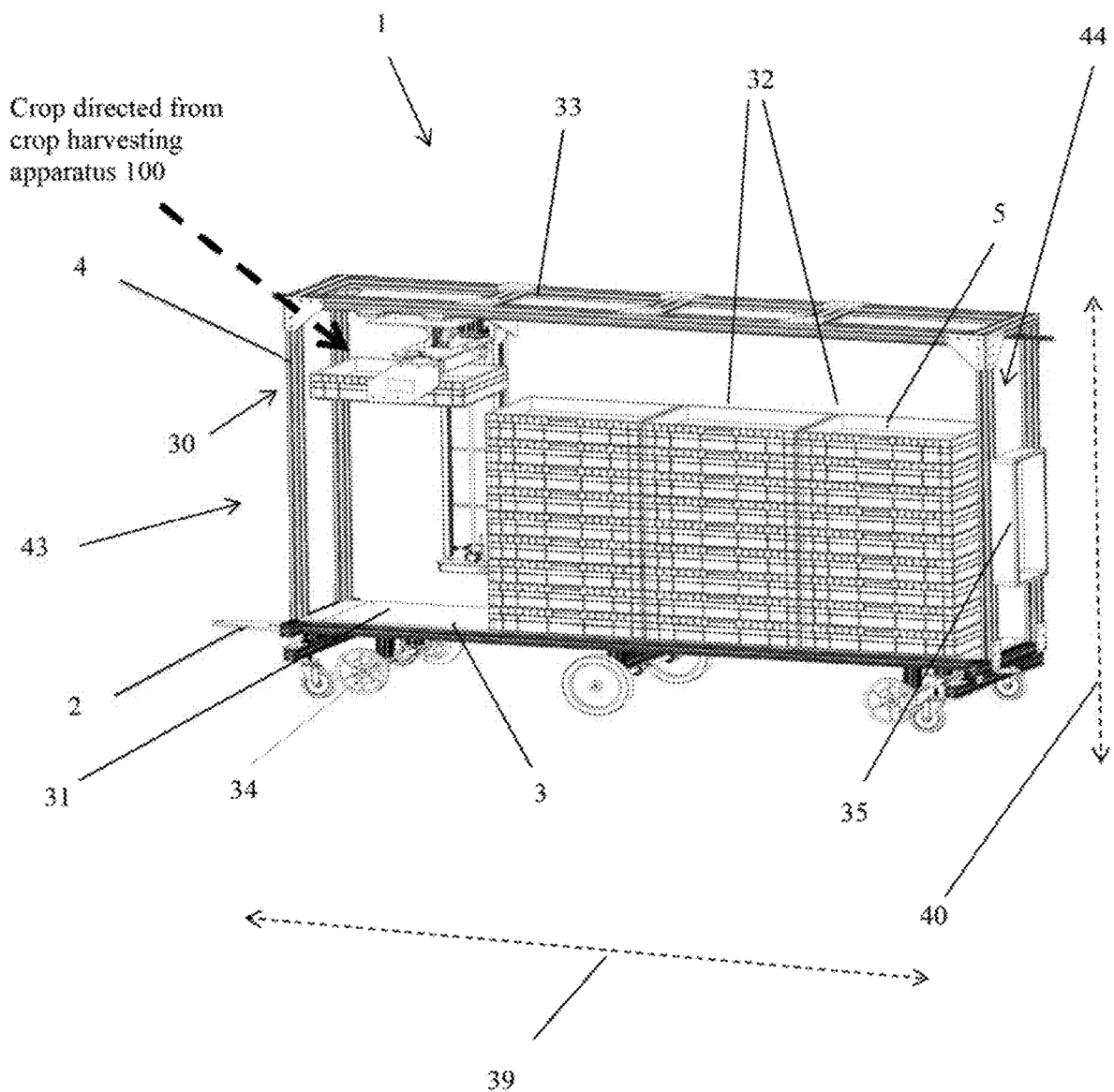
FIG. 1 shows an embodiment of the cart assembly.

The following description is of an embodiment presently contemplated for carrying out the present invention. This description is not to be taken in a limiting sense, but is made merely for the purpose of describing the general principles and features of the present invention. The scope of the present invention should be determined with reference to the claims.

Embodiments relate to a cart assembly 1 that can be used to receive, organize, and transport objects. It is contemplated for the objects to be crops being picked from plants via a crop harvesting apparatus 100, 100' (see FIGS. 9-11); however, the objects can be any object being conveyed to the cart assembly 1.

Once the crop is removed from the plant, the crop is directed to the cart assembly 1. For example, the crop can be directed to a container 5 (or crate) of the cart assembly 1, wherein the cart assembly 1 receives the crop in a container 5 the cart assembly 1 has positioned at the receiving site 30. The containers 5 can be a crate or bin designed to receive a predetermined number of crops and can be configured to be stacked on top of each other or within each other. For instance, each container 5 can be a rectangular crate having a storage area and a flanged rim so as to allow crops to be placed within the storage area and allow filled crates to be stacked on top of each other without the bottom of the top crate making contact with the crops in the bottom crate due to the flanged rim suspending the top crate on the bottom crate. Once a desired number of crops (e.g., enough that would maximize the number of crops in the container 5 but avoid damage or bruising of the crops in the container 5 due to the weight of the crops stacked on top of each other) are received in the container 5, the cart assembly 1 automatically transports the filled container 5 to a filled-container staging area 31 of the cart assembly 1. The cart assembly 1 then retrieves an empty container 5 from an empty-container staging area 32 of the cart assembly 1 and transports the empty container 5 to the receiving site 30.

Referring to FIG. 1, the cart assembly 1 includes a cart having a lower deck 3, vertical supports 4, and an upper deck 33. The cart assembly 1 can be constructed from a rigid material such as metal, plastic, fiberglass, polymer, etc. For instance, the structural components of the cart assembly 1 can be constructed from configurable aluminum extrusions (for low rate applications for example), welding tube sections (for high volume production needs for example), etc. The lower deck 3 is a platform configured to support a plurality of containers 5. The platform can be solid, perforated, grated, etc. The lower deck 3 shown in FIG. 1 is rectangular in shape, but other shapes can be used. The lower deck 3 is designed to serve as a staging area 31, 32 for containers 5 that are stacked on top or within each other to form columns of stacked containers 5. For instance, the lower deck 3 can be configured to support a first column of containers 5, a second column of containers 5, a third column of containers 5, etc. The first, second, and third column of containers 5 may be positioned on the lower deck 3 in an area that is designated as the empty-container staging area 32. A portion of the lower deck 3 is reserved (e.g., have no containers placed thereon) to serve as the filled-container staging area 31. As noted above, once containers 5 are filled with crops, the cart assembly 1 places the filled containers 5 on the lower deck 3 in an area that is designated as the filled-container staging area 31. The lower deck 3 has wheels 34 to facilitate motion of the cart assembly 1. The wheels 34 can be flanged track wheels, for example, so as to allow for engagement with rails or tracks placed on a ground or floor of a crop harvesting facility. Other types of wheels 34 can also be used. These can include caster wheels, for example. The rails or tacks can be those that are already installed in the crop harvesting facility so as to allow the cart assembly 1 to be seamlessly integrated into existing production lines.

When used in conjunction with a crop harvesting apparatus 100, 100', it is contemplated for the cart assembly 1 to be transported by a crop harvesting apparatus 100, 100' (see FIGS. 9-11) via connection thereto by a hitch/pin connection 2. The hitch/pin connection 2 can further include electrical connectors to facilitate electrical power and/or electrical communication between the crop harvesting apparatus 100, 100' and the cart assembly 1, allowing for electrical power transfer from the crop harvester apparatus 100, 100' to the cart assembly 1 and allowing for two-way communication between the two. In addition, or in the alternative, each of the crop harvesting apparatus 100, 100' and the cart assembly 1 can include transceivers to facilitate wireless communication between each other. In some embodiments, the cart assembly 1 has its own means of propulsion. This can be achieved via an electric motor and battery-power supply with a drivetrain to deliver power to the wheels 34. For instance, the lower deck 3 can be configured to house the batteries, electric motor, and drivetrain necessary for propelling the cart assembly 1.

The cart assembly 1 has a control module 35 configured to receive and issue commands, as well as receive, process, store, and transmit signals or data. As will be explained later, the crop harvester apparatus also has a control module 112. Any of the components of the crop harvesting apparatus 100, 100' and the cart assembly 1 can have application programming interface (API) to facilitate command and control of the component via its respective control module 112, 35.

The vertical supports 4 are beams, rails, bars, etc. that extend up from the lower deck 3 and provide structural support and stability for the cart assembly 1. The vertical supports extend up from the lower deck 3 to the upper deck 33 and provide support for the upper deck 33. The upper deck 33 can be similar in construction to the lower deck 3, but be configured to support the gantry 36 and gripper system 37 (each described in more detail later).

The lower deck 3, the upper deck 33, and the vertical supports 4 form a space within which the containers 5 are held and maneuvered. This space is referred to as the bounding box. The lower deck 3, the upper deck 33, and the vertical supports 4 can be constructed of connectable and adjustable subparts so as to allow the dimensions (as well as the bounding box) of the cart assembly 1 to be adjustable. This can allow the cart assembly 1 to be configured and reconfigured to accommodate each crop harvesting facility's operational envelopes, as well as various guide rail pitches, etc. For instance, the dimensions of the cart assembly 1 and the structure of the bounding box can be sized so that the cart assembly 1 can travel through all areas of a crop harvesting production line like a traditional hand loaded cart would be able to.

Figure 2:
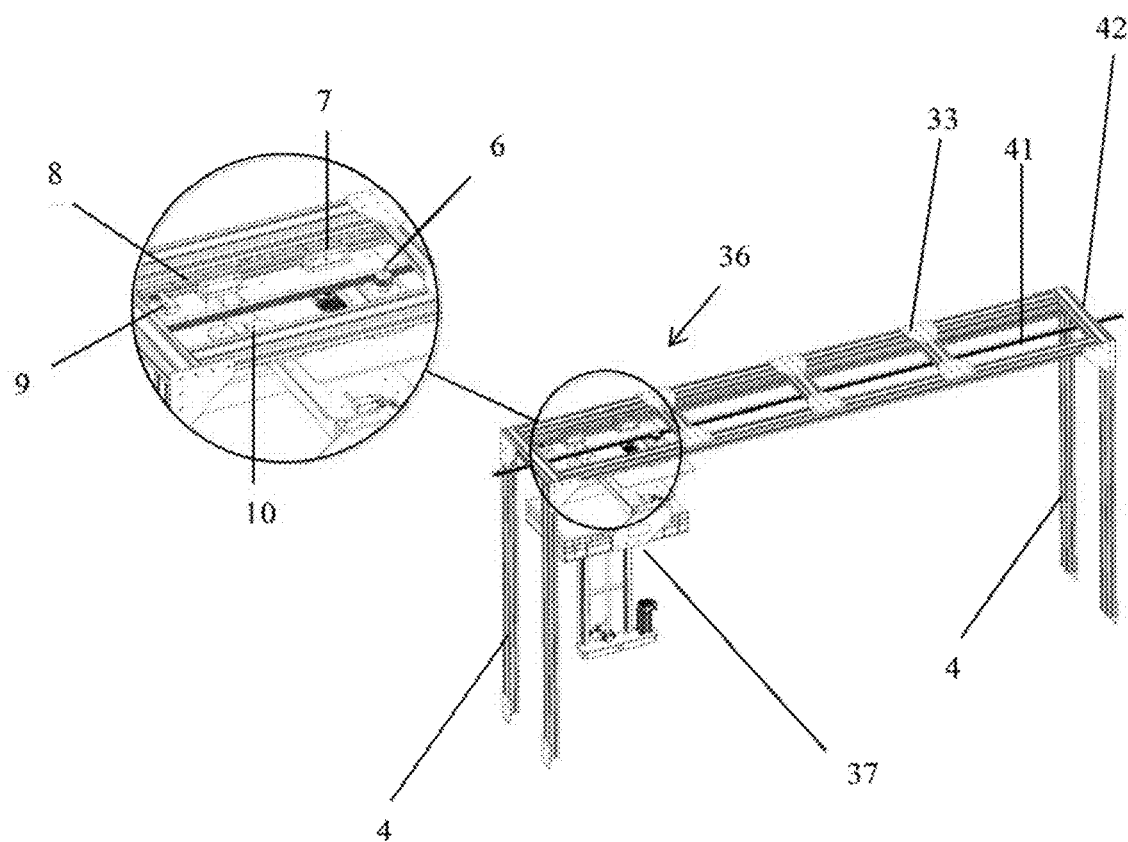
FIG. 2 shows an embodiment of the horizontal motion servo connected to a rack and pinion and a series of reciprocating ball bearing carriages and rails extending along the horizontal axis of the upper deck of the cart assembly.
Figure 3:
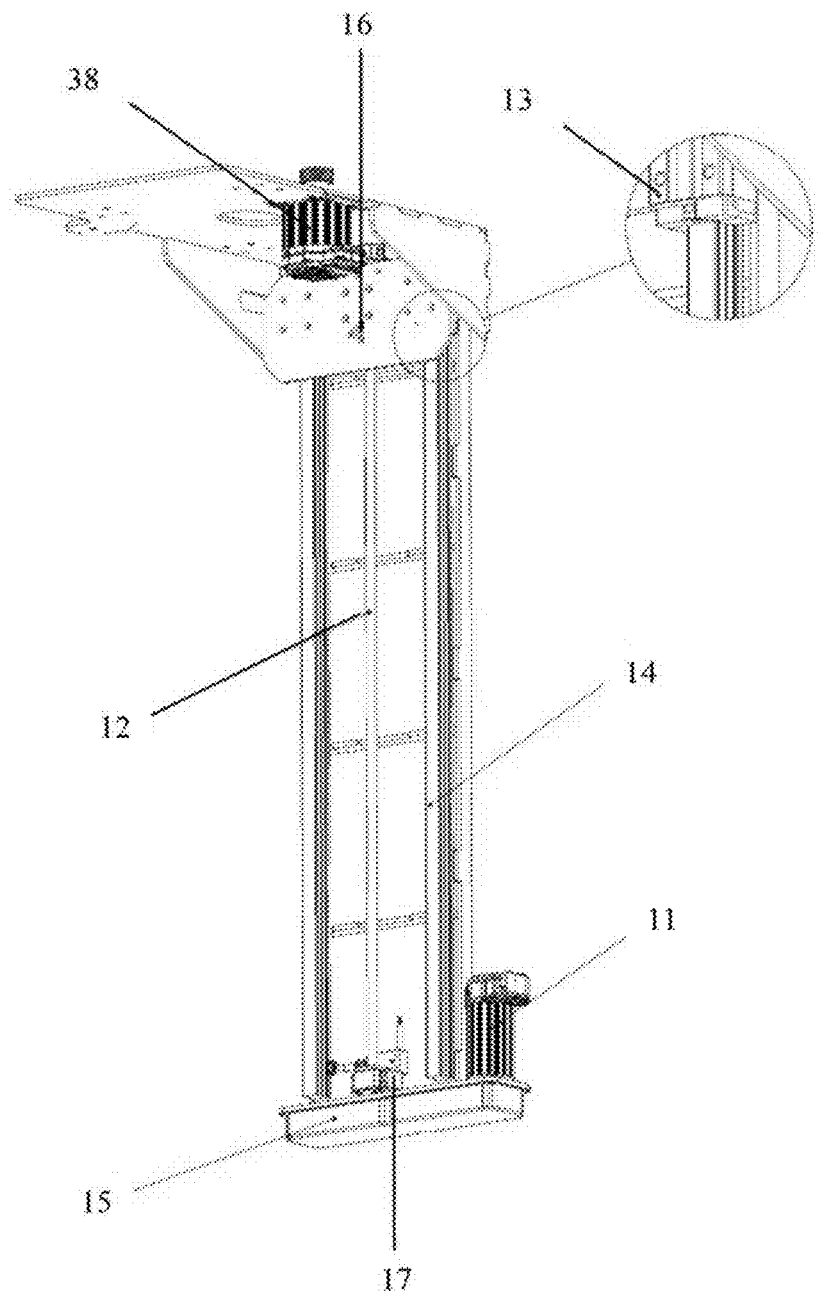
FIG. 3 shows an embodiment of the vertical motion servo connected to a lead screw and series of reciprocating ball bearing carriages and rails extending down from the upper deck along the vertical axis of the upper deck of the cart assembly.

Referring to FIGS. 2-3, the cart assembly 1 includes a gantry 36. The gantry 36 is secured to the upper deck 33. The gantry 36 has a horizontal motion servo 38 (along with an electric motor) configured to cause the gantry 36 to motion in a horizontal direction 39 via a rack 41 and pinion 6 setup. The horizontal motion servo 38 is connected to a rack 41 and pinion 6 system and a series of reciprocating ball bearing carriages 7 and rails 8 extending along the horizontal axis of the upper deck 33. The horizontal motion servo 38 is configured to power the pinion 6 via rack and pinion setup. Actuation of the horizontal motion servo 38 causes the pinion 6 to rotate and forces the gantry 36 to motion along the horizontal direction 39 along the reciprocating ball bearing carriages 7 and rails 8. The range of motion can be from a first distal end 43 (e.g., where the receiving site 30 is located) of the upper deck 33 to a second distal end 44 (e.g., a location subtending the receiving site 30 location) of the upper deck 33.

The gantry 36 also includes a vertical motion servo 11 (along with an electric motor) configured to cause the gantry 36 to motion in a vertical direction 40. The vertical motion servo 11 is connected to a lead screw 12 and a series of reciprocating ball bearing carriages 13 and rails 14 extending down (towards the lower deck 3) from the upper deck 33 along the vertical axis of the upper deck 33. The vertical motion servo 11 is configured to power the lead screw 12 via a belt and pulley system 15, wherein thrust is transferred to a mount for the gripper system 37 by means of a lead screw nut 16. Actuation of the vertical motion servo 11 causes the lead screw 12 to rotate and forces the gripper system 37 to motion along the vertical direction 40 along the reciprocating ball bearing carriages 13 and rails 14. The range of motion can be from the upper deck 33 to the lower deck 3.

The vertical motion servo 11 and/or the horizontal motion servo 38 can include a brake system 10 (e.g., an electromagnet brake that activates when power is cut off or when a fault signal is received) to cease movement of the gantry 36 at a desired location. The brake 10 may be used to keep the gantry 36 stable when not under power, for example. In some embodiments, the rack 41 and pinion 6 to which the horizontal motion servo 38 can be a self-locking lead screw so as to not be back driven, and thus the horizontal motion servo 38 would not need a brake system 10.

Any one or combination of the horizontal motion servo 38 and the vertical motion servo 11 can be configured to provide a continuous position feedback and to monitor motor torque. This can be achieved via the use of encoders, sensors, processors, etc. If a position error occurs or an abnormal torque condition is detected, the processor of the servo 11, 38 triggers a fault state. The fault state can be transmitted as a signal to the control module 35 of the cart assembly 1 and/or the control module 112 of the crop harvesting apparatus 100, 100'. Once the fault state is received, the control module(s) 35, 112 pause operational movements of the servos 11, 38 and/or other components until the fault is resolved. In addition, the indication of a fault state occurring can be displayed on a status indicator light of the servo 11, 38.

The horizontal motion servo 38 includes a limit switch 9. The vertical motion servo 11 includes a limit switch 17. The limit switches 9, 17, along with the brake system 10, can be used to assist with startup homing procedures. For instance, once a fault state is detected, the brake system 10 can be used to prevent movement of the vertical motion servo 11. After the fault state is resolved, the limit switches 9, 11 can be used to cause the servos 11, 38 to move to a start position via a homing procedure (this will be discussed in more detail later).

Figure 4:
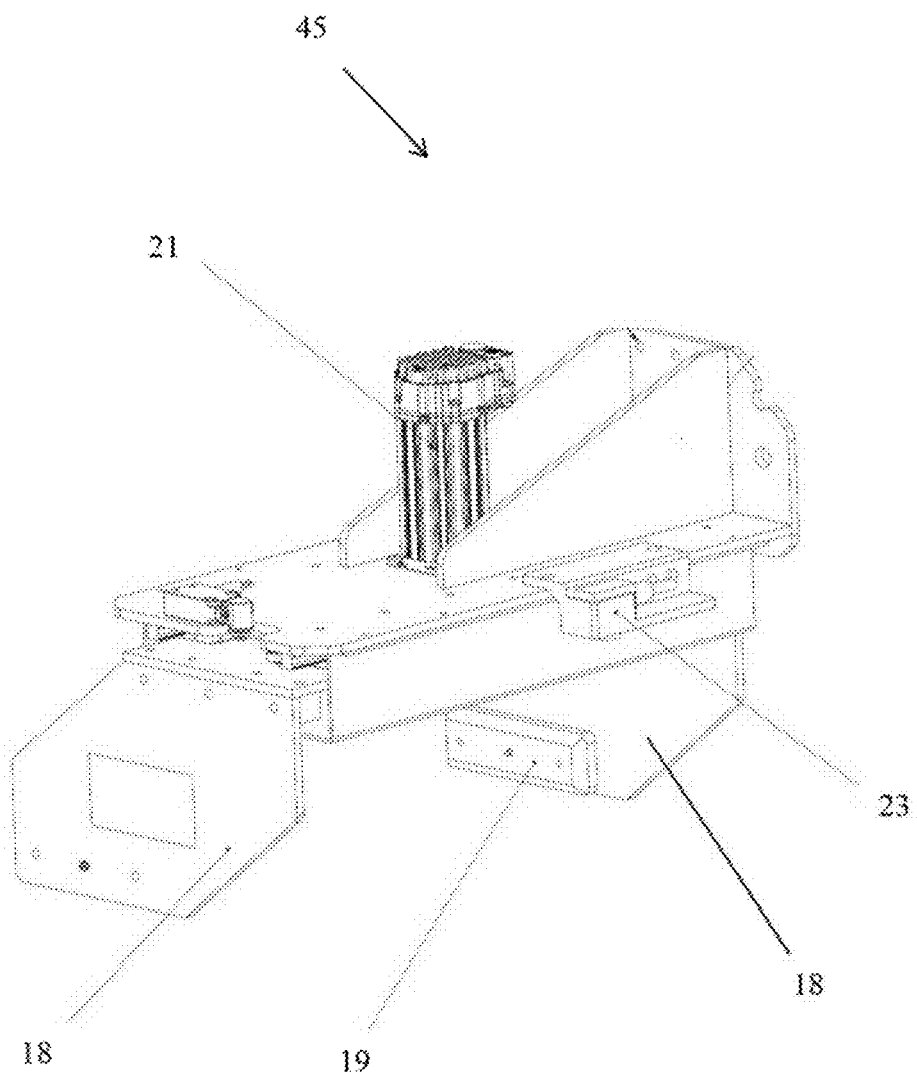
FIG. 4 shows an embodiment of the gripper system.
Figure 5:
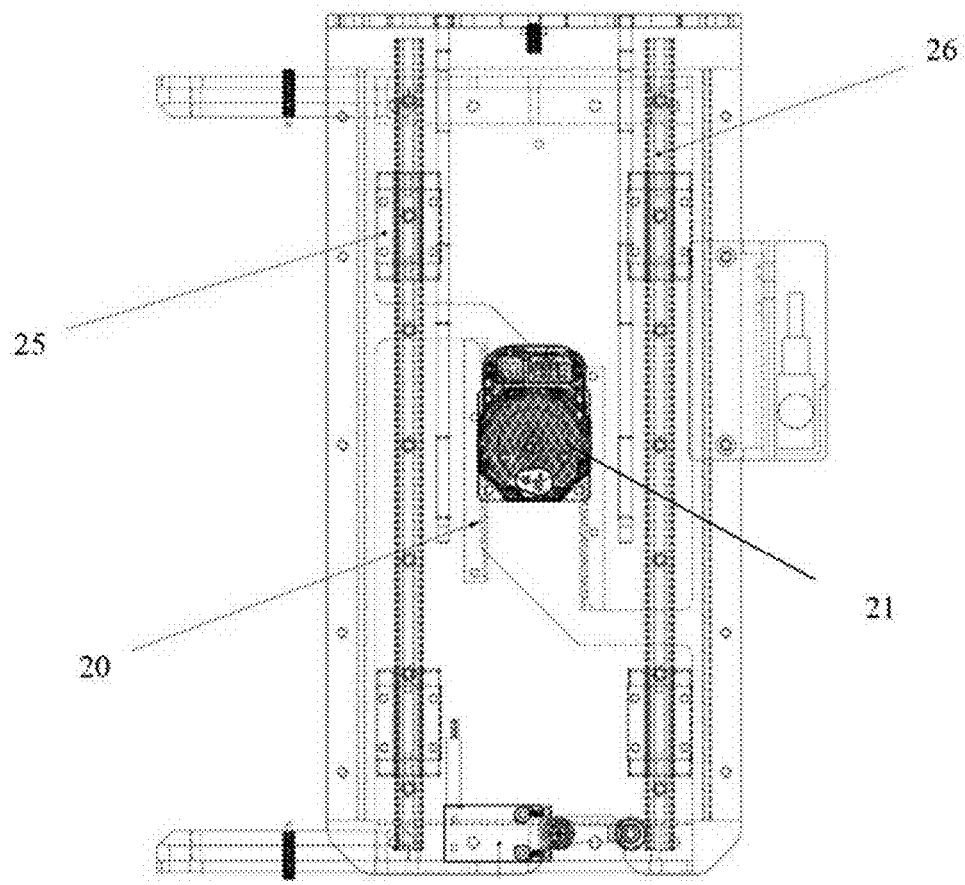
FIG. 5 shows another view of the gripper system.
Figure 6:
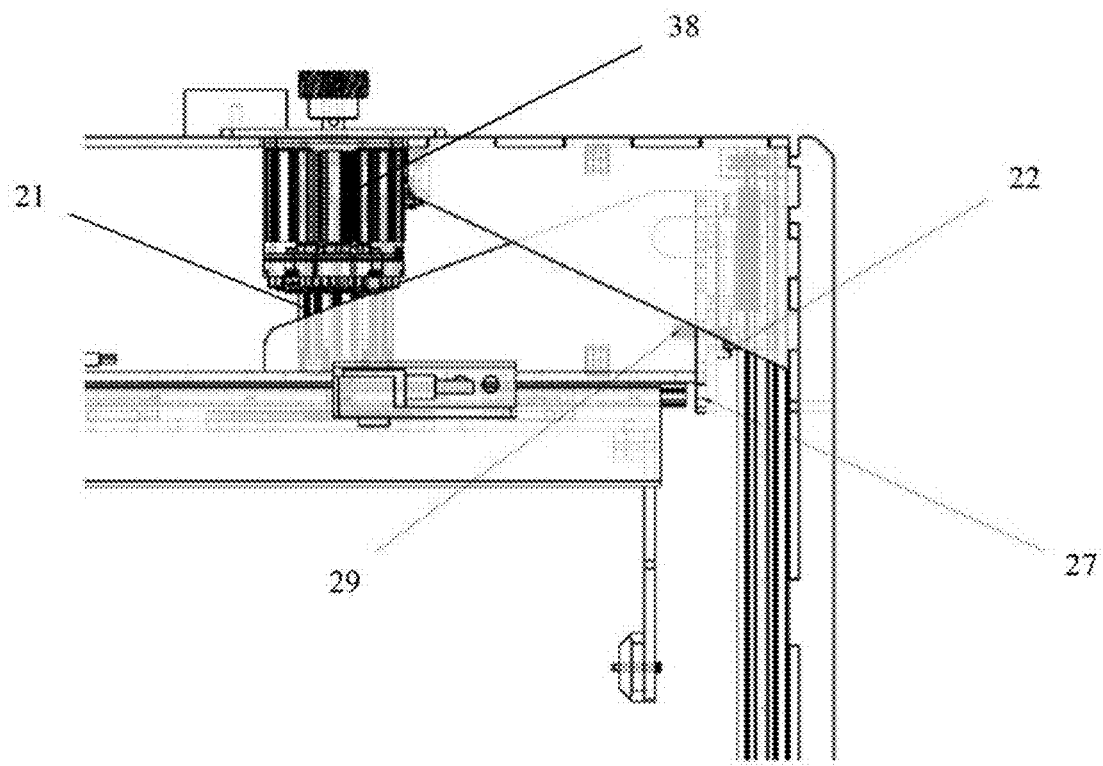
FIG. 6 shows another view of the gripper system.

Referring to FIGS. 4-6, the gantry 36 includes a gripper system 37 configured to grab a container(s) 5 and transport it/them throughout the range of motion of the servos 11, 38. For instance, the gripper system 37 grabs an empty container 5 at the receiving site 30 and places the container 5 on the lower deck 3 at the empty-container staging area 32. The gripper system 37 can be used to repeatedly do this so as to stack a plurality of empty containers 5 on top of each other to form a column(s) of empty containers 5 at the empty-container staging area 32. Alternately, the empty containers 5 can be stacked manually in the empty-container staging area 32. The cart assembly 1 is then transported via the crop harvesting apparatus 100, 100' throughout a crop harvesting facility to collect crops. Before or during the collection of the crops by the crop harvesting apparatus 100, 100', the gantry 36 positions the gripper system 37 over an empty container 5 to allow it to grab the empty container 5 from the empty-container staging area 32. The gantry 36 causes the gripper system 37 to move (along with the empty container 5) to the receiving site 30 to allow the crops being collected to be placed within the container 5. Once a desired number of crops are received, the gantry 30 causes the griper system 37 to move (along with the filled container) to the filled-container staging area 31. The gripper system 37 then releases the filled container 5 and allows it to rest upon the lower deck 3 and/or another filled container 5. This can be repeated to form a column(s) of filled containers 5 in the filled-container staging area 31. Additional columns of filled containers 5 can be created.

In some embodiments, the vertical motion servo 11 and/or the horizontal motion servo 38 causes the container 5 to reciprocate in a vertical and/or horizontal motion while the container 5 is at the receiving site 30 and crops are being deposited in the container 5. This can be done to ensure an even distribution of crops is obtained in the container 5. As will be explained in detail later, the gantry 36 and/or gripper system 37 can include a sensor(s) 23 (count sensor, weight sensor, proximity sensor, motion sensor, etc.) to assist with determining correct positioning of the gantry 36 and/or gripper system 37 and for determining when a desired amount of crops have been received by the container, thereby creating a filled container 5. In some embodiments, these sensors can also monitor the distribution of crops placed in the container 5 to allow the system to determine when and how to motion the container 5 to effectuate the even distribution of crops in the container 5.

In an exemplary embodiment, the gripper system 37 includes at least two gripper arms 18, each having a container grip 19. For instance, gripper system 37 can have a support structure with a first gripper arm 18 and parallelly positioned a second gripper arm 18 extending therefrom. A container grip 19 can be positioned on an inner side surface (a surface of the gripper arm 18 that faces the other gripper arm 1) of each gripper arm 18. The container grip 19 can be a textured or nonslip member (e.g., a rubber bumper) attached to the inner side surface of the gripper arm 18. The first and second gripper arms 18 are configured to move inward (towards each other) and outward (away from each other). The first and second gripper arms 18 can be moved outward to generate a space between each other that is wider than a width of a container 5, thereby allowing the gripper system 37 to envelope a container 5. The gripper system 37 has an opposing rack and pinion drivetrain 20, a gripping arm servo motor 21, reciprocating ball bearing carriages 25, and linear guide rails 26 to facilitate operation of the gripping arms 18. The gripping arm servo motor 21 controls operation of the opposing rack and pinion drivetrain 20 to cause the first and second gripping arms 18 to ride on the reciprocating ball bearing carriages 25 and linear guide rails 26, thereby causing the first and second arms 18 to move inward or outward. In some embodiments, each of the first gripping arm 18 and the second gripping arm 18 has a gripping arm servo motor 21 to facilitate operation of each gripping arm 18 independently.

Once the gripper system 37 is in proper position over the container 5 so as to allow the gripper system 37 to envelope the container 5 (e.g., the first and second arms 18 are extended outward to generate a space between them that is wider than the container 5), the first and second gripper arms 18 can be moved inward until the gripper arms 18 secure the container 5 between each other. The container 5 is then moved about the bounding box of the cart assembly 1. Once the container 5 is in a location to be released (e.g., on the lower deck 3 or in/on another container 5 in a staging area 31, 32), the first and second arms 18 are moved outward to release the container 5. While it is contemplated for both of the first and second arms 18 to be motion simultaneously, it is understood that the gripper system 37 can be configured so that any of the first or second arms 18 are selectively motioned (e.g., one can be moved while the other is held still, one can be moved at a faster or slower rate than the other, one can be movable while the other is stationary, etc.).

This drive method for the gripper system 37 provides for repeatable capture and release of containers 5. This drive method also allows the gripper system 37 to accurately grab containers 5 regardless of whether the containers 5 are properly stacked (or aligned) or whether the containers are not properly stacked (or misaligned). For instance, the containers 5 may become misaligned by being shifting while the cart assembly 1 is transported about the crop harvesting facility to collect crops. The container grips 19, however, act as wedges when picking up a container 5. If a container 5 is misaligned, these container grips 19 move and center the container 5 as the first and second grab arms 18 move inward. Thus, the container grips 19 can act as self-aligning grips.

In some embodiments, the gripper system 37 has a load cell 22. It is contemplated for the load cell 22 to be positioned at a location where the gripper system 37 interfaces with a lead nut plate 27 of the gantry 36; however, the load cell 22 can be positioned at other locations. As containers 5 fill up with crops, a moment is generated about mounting bolts that mount the gripper system 37 to the gantry 36, and a resulting force is transmitted to the load cell 22 via a set screw 29. This resulting force is used to calculate a weight for the container 5 and the crops placed therein (the "load"). This weight value is transmitted to the control module 35 for processing and/or storage. The set screw 29 can be used to preload the load cell 22 so as to adjust the sensitivity (e.g., increase or decrease the load depending on the particular application).

In some embodiments, the gripper system 37 includes a positon sensor(s) 23 (ultrasonic, proximity, optical, etc.). These may be used to refine the positioning of the gripper system 37 and/or gripper arms 18 as it/they close in on grabbing a container 5. Generalized container 5 locations within the staging areas 31, 32 are coded into the operating firmware of the control module 35, but if the container 5 shifts or is improperly stacked, the positioning sensor(s) 23 provide fine adjustment information for the vertical and/or horizontal motion servos 11, 38 to course-correct. For instance, the control module 35 (via data from the sensor(s) 23) can determine the actual placement and orientation of the container 5 and cause the servos 11, 21, 38 to actuate to position the gripper system 37 so as to allow it to envelope the mis-aligned container 5. The servos 11, 21, 38 can be actuated to shift the container 5 into proper alignment before grabbing the container 5, or if it is safe to grab as it is the servo 21 can be actuate to grab the container 5.

Figure 7:
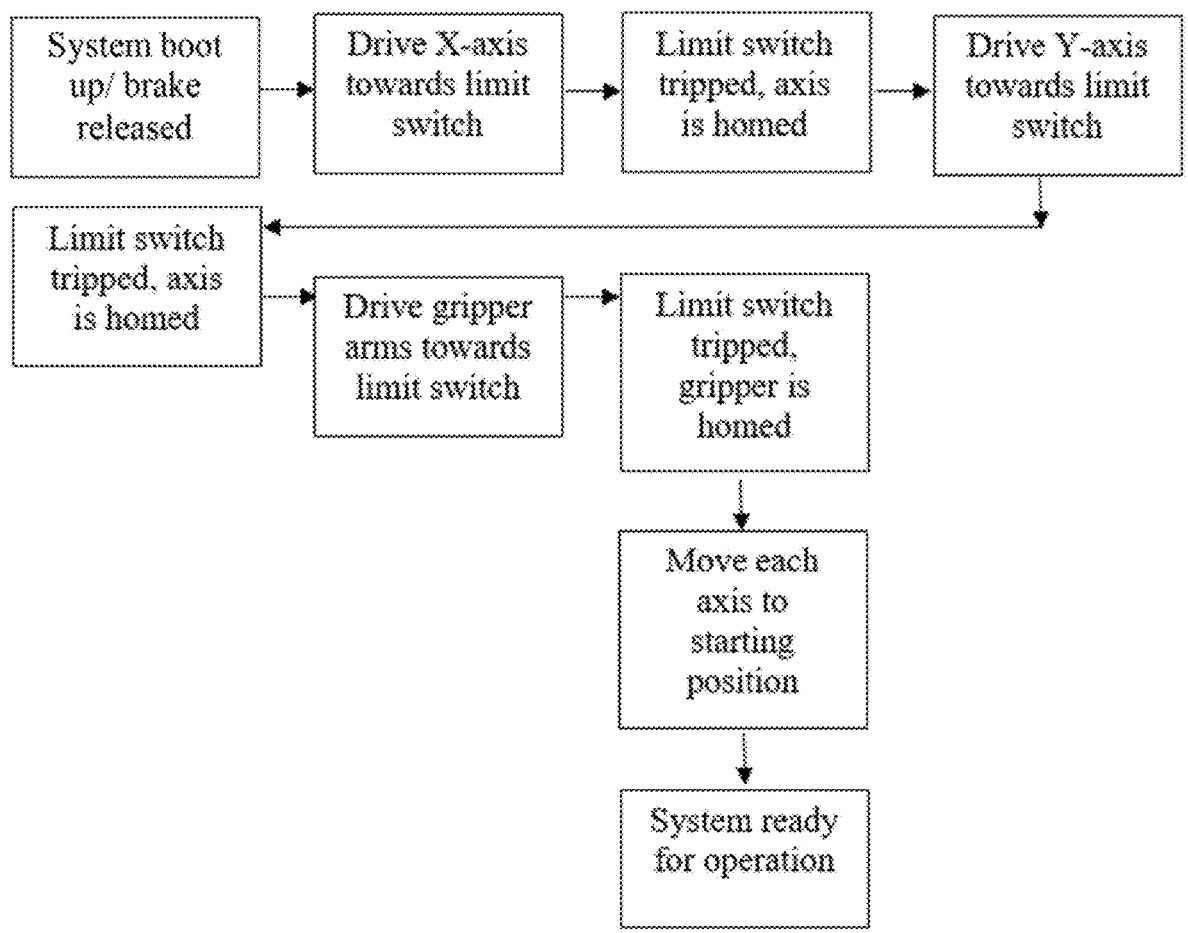
FIG. 7 shows an exemplary homing procedure operational flow diagram for an embodiment of the cart assembly.

Referring to FIG. 7, it is contemplated for the control module 35 to utilize a homing procedure. The homing procedure is a default setting/positioning of the vertical motion servo 11, the horizontal motion servo 38, and the gripper system 37 when the cart assembly 1 is reset, experiences a system fault, is powered-on after being powered-off, etc. The homing procedure involves moving all three subsystems (the vertical motion servo 11, the horizontal motion servo 38, and the gripper system 37) to develop a system initializing point. During the exemplary homing procedure outlined in FIG. 7, the system boots up and the brake 10 is released. The system then activates the horizontal motion servo 38 (or the x-axis drive) towards the limit switch 9. The limit switch 9 is tripped, causing the horizontal motion servo 38 to be homed. The system then activates the vertical motion servo 11 (or the y-axis drive) towards the limit switch 17. The limit switch 17 is tripped, causing the vertical motion servo 11 to be homed. The homed positions for the horizontal motion servo 38 and vertical motion servo 11 can be a position that locates the gantry 36 at the receiving site 30, for example. The gripper system 37 homes too. The gripper system 37 includes a limit switch (the limit switch can be seen in FIG. 4 on the far left and in FIG. 5 on the bottom), wherein when the gripper system 37 is activated towards its limit switch the first and second gripper arms 18 are homed. The homed positions for the first and second gripper arms 18 can be positioning them so as to be wider than a width of a container 5, for example.

Figure 8A:
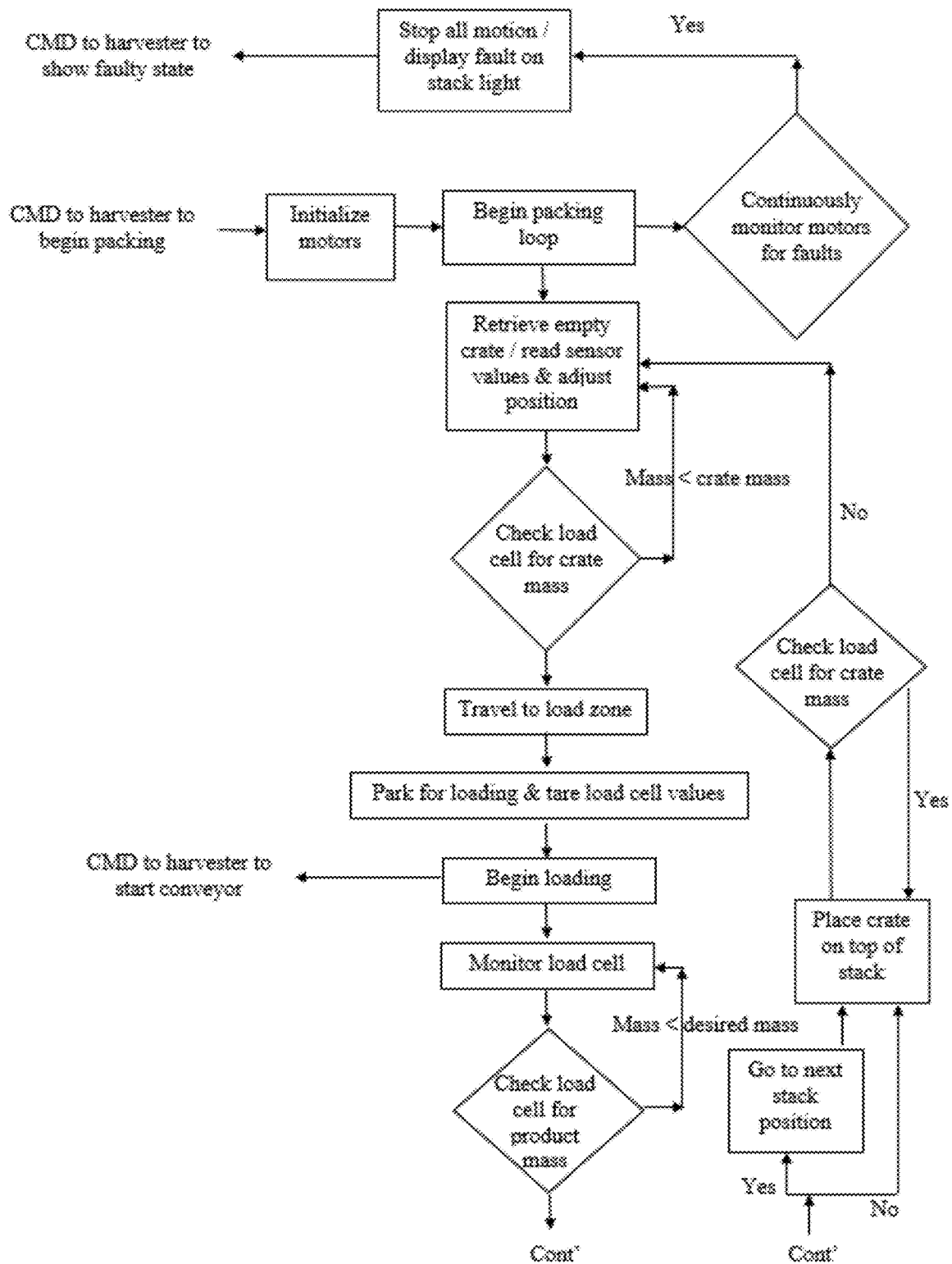
FIGS. 8A-8B show an exemplary packing procedure operational flow diagram for an embodiment of the cart assembly.
Figure 8B:
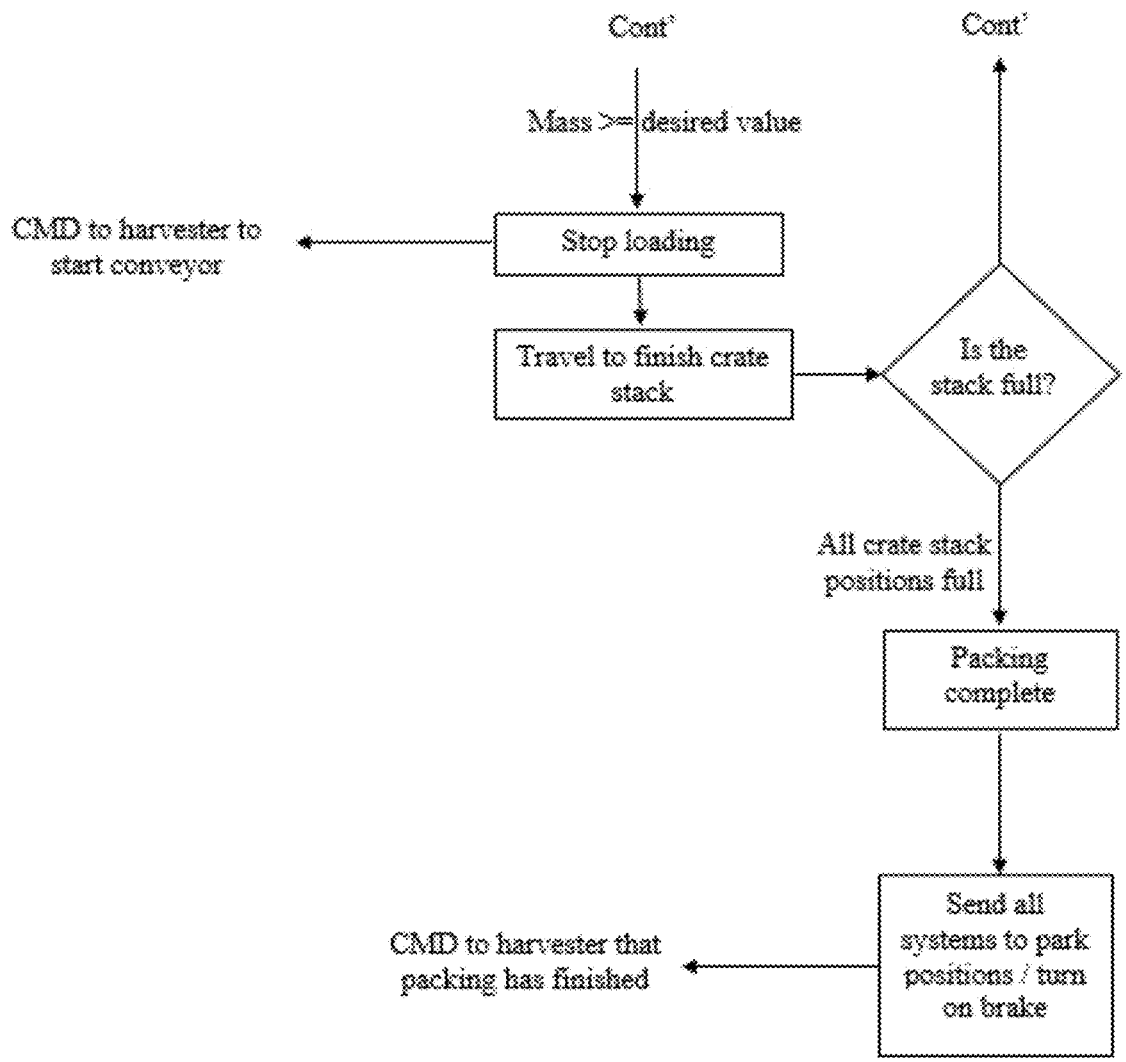

The three subsystems (the vertical motion servo 11, the horizontal motion servo 38, and the gripper system 37) work in tandem to provide the automated moving, monitoring, and stacking of containers 5 that has heretofore not been available by convention systems. This automated procedure is referred to herein as a packing procedure. (See FIGS. 8A-8B). The packing procedure involves moving the gantry 36 to a column of containers 5, retrieving an empty container 54, moving the empty container 5 to the receiving site 30, determining when a desired number of crops have been deposited therein (i.e., determining when the container 5 is filled), restacking the full container 5, and repeating the process until all of the empty containers 5 have been filled. During the exemplary packing procedure outlined in FIGS. 8A-8B, the crop harvester apparatus 100, 100' (via its control module 112) transmits a signal to the control module 35 of the cart assembly 1 indicating that crops are being (or about to be) harvested for packing. The control module 35 initiates the servos 11, 21, 38 to begin the packing loop. The system continuously monitors servos 11, 21, 38 for faults. If a fault is detected, a fault state signal is transmitted to the control modules 35, 112. If no fault is detected, the packing loop continues in which the gantry 36 is caused to move the gripper system 37 to the empty-container staging area 30 to retrieve an empty container 5. The sensors 23 and self-aligning container grips 19 are used to adjust position of the gripper system 37 and/or the container 5 (if necessary). The load cell 22 and control module 35 determine if the mass of the load is greater than the known mass of the container 5 to determine if the container 5 retrieved is an empty container 5. If the container 5 is an empty container 5, the container 5 is moved to the receiving site 30. Once the empty container 5 is at the receiving site 30, the control module 35 transmits a signal to the control module 112 of the crop harvester 100, 100' to begin conveying crops to the container 5. As crops are being deposited in the container 5, the load cell 22 monitors (continuously, semi-continuously, at a predetermine rate, etc.) the mass of the load to determine if a desired amount/number of crops have been deposited (e.g., enough that would maximize the amount/number of crops in the container 5 but avoid damage or bruising of the crops in the container 5 due to the weight of the crops stacked on top of each other). If a desired number of crops have been deposited, the control module 35 transmits a signal to the control module 112 to stop conveying crops. The gantry 36 transports the filled container 5 to the filled-container staging area 31. The gantry 36 lowers the filled container 5 to place it on the lower deck 3 or on another filled container 5. The vertical position of the gantry 36 when it lowers the filled container 5 is used as a proxy to determine if the column of filled containers 5 has reached a maximum within the space provided by the bounding box. If the column does not fill the vertical space within the bounding box, the gripper system 37 releases the filled container 5. The load cell 22 can be used to determine if the filled container 5 had actually been released before moving the gantry 36. If the column does fill the vertical space of the bounding box, the gantry 36 moves to another location in the filled-container staging area 30. Once released, the gantry 36 is moved to the empty-container staging area 30 to retrieve another empty container 5 to repeat the process. When all of the filled-container staging area 31 locations are filled and the vertical space within the bounding box is maximized due to the columns of stacked containers 5, the control module 35 transmits a signal to the control module 112 to indicate that the packing procedure is complete. The control module 112 then stops conveyance of the crops. The control module 35 then returns the servos 11, 21, 38 to the homing position and actuates the brake system 10.

Figure 9:
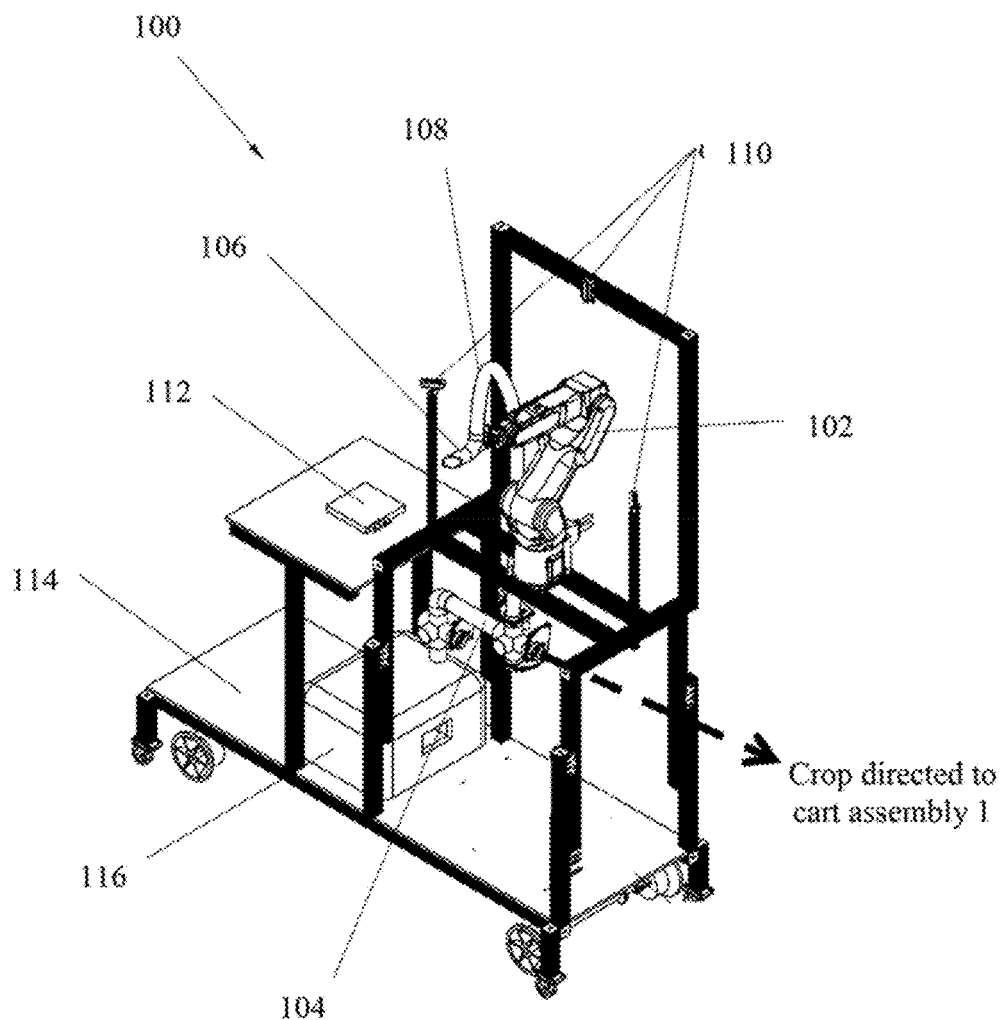
FIG. 9 shows an exemplary crop harvesting apparatus that may be used with an embodiment of the cart assembly.

FIG. 9 shows an exemplary crop harvesting apparatus 100 that may be used to retrieve crops from plants and direct them to an embodiment of the cart assembly 1. The exemplary crop harvesting apparatus 100 includes a vacuum source 102 and a crop sorter 104 in connection with the vacuum source 102. The crop sorter 104 is configured to sort crops based on at least one criterion (e.g., a type, a size, a color, a hue, a ripeness, insect infestation, presence of fungi, presence of bacteria, and presence of spots or discoloration of crops or plants associated with the crops). The crop harvesting apparatus 100 includes an end-effector 106 having an end-effector nozzle with an opening formed in the distal end. The crop harvesting apparatus 100 includes a flexible tube 108 facilitating connection of the end-effector 106 to the crop sorter 104. The crop harvesting apparatus 100 includes a garnering camera 110 configured to collect information related to the at least one criterion and generate garnering crop criteria data. The crop harvesting apparatus 100 includes a sorting camera configured to collect information related to the at least one criterion and generate sorting crop criteria data. The crop harvesting apparatus 100 includes an actuating system configured to support and position the end-effector 106. A control module 112 is included and is configured to receive and analyze the garnering crop criteria data and the sorting crop criteria data to identify crops meeting the at least one criterion and crops not meeting the at least one criterion. The control module 112 is configured to perform a first examination using the garnering crop criteria data to determine whether crops meet the at least one criterion or not meet the at least one criterion. Based on the first examination, the control module 112 causes the crop harvesting apparatus to selectively garner crops from a plant through the end-effector. The control module 112 is configured to perform a second examination using the sorting crop criteria data to determine whether the garnered crops meet the at least one criterion or not meet the at least one criterion. Based on the second examination, the control module 112 causes the crop harvesting apparatus 100 to generate a first path or a second path for the garnered crops. The first path is an acceptance path designated for garnered crops that meet the at least one criterion. The second path is a rejection path designated for garnered crops that do not meet the at least one criterion. The control module 112 is also configured to selectively garner crops by causing the actuating system to position the end-effector nozzle proximate to a target crop so that a suction force generated via the vacuum source 102 removes the target crop from the plant. The target crop is a crop that is identified as meeting the at least one criterion via the first examination. Embodiments of the crop harvesting apparatus 100 can be placed on a carriage 114 to facilitate movement of the crop harvesting apparatus 100. Some embodiments of the crop harvesting apparatus 100 can include a rejection bin 116 to which crops not satisfying the at least one criterion are directed. The description of the crop harvesting apparatus 100 described above and illustrated in FIG. 9 is exemplary only. Other crop harvesting apparatuses and configurations can be used.

Figure 10:
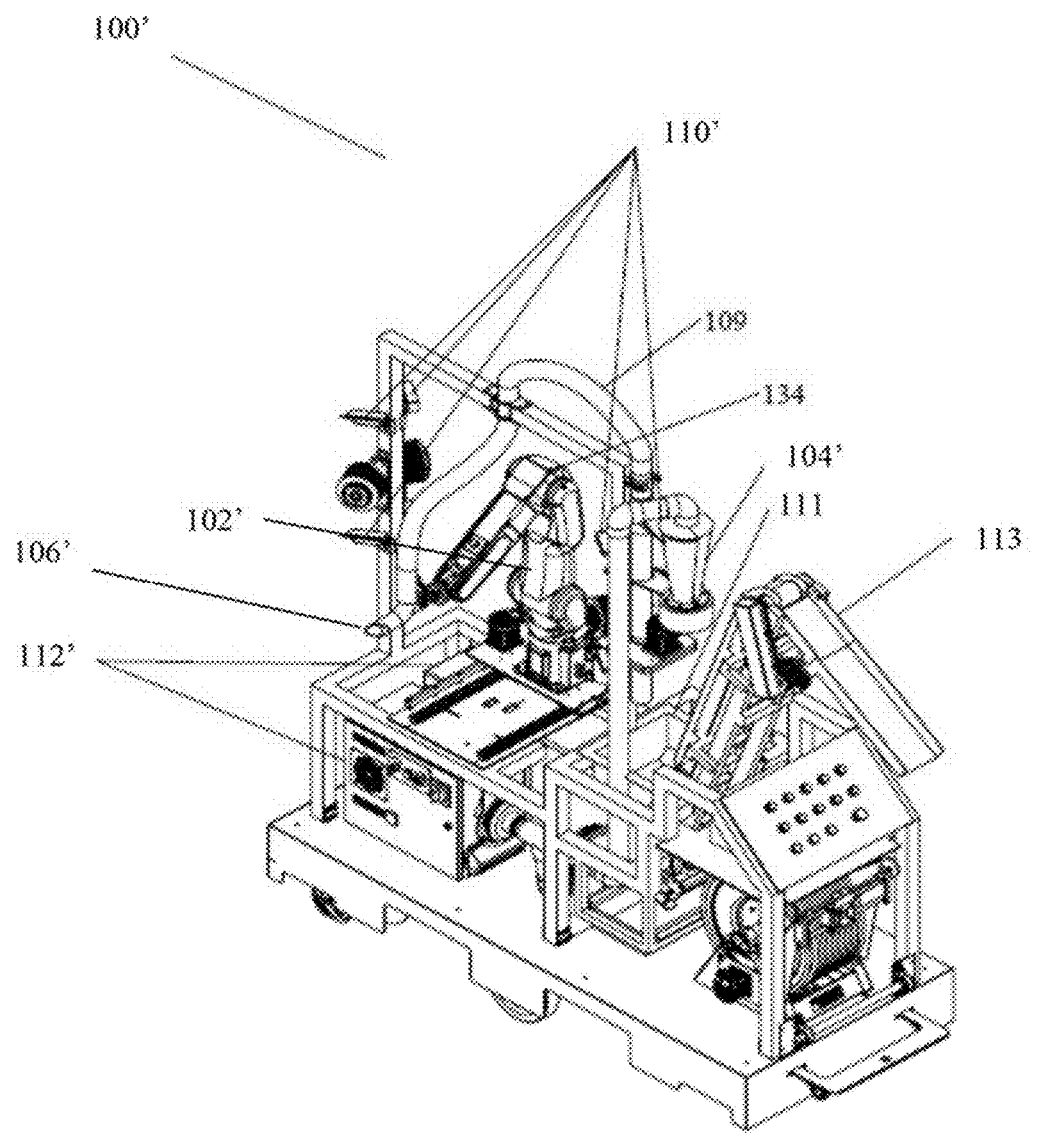
FIG. 10 shows another exemplary crop harvesting apparatus that may be used with an embodiment of the cart assembly.
Figure 11:
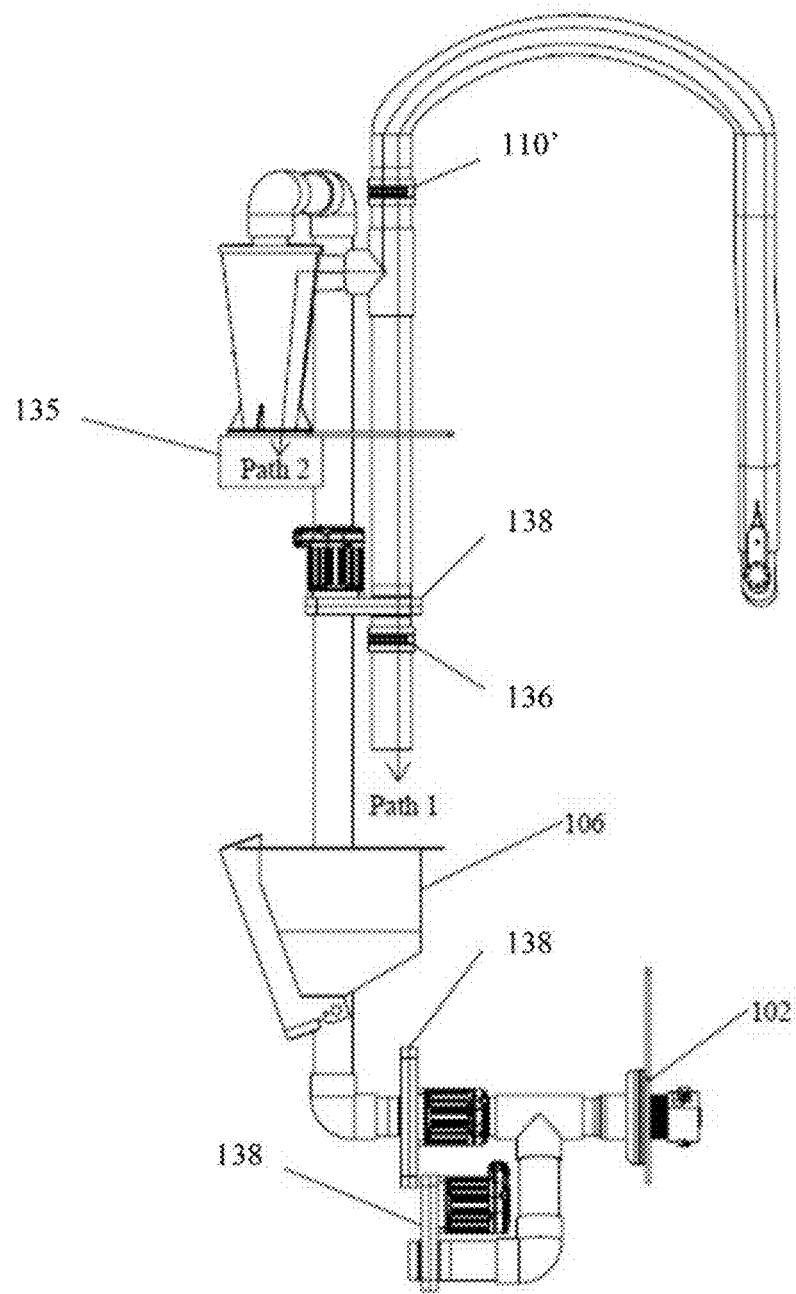
FIG. 11 shows an exemplary crop sorter that can be used with the crop harvesting apparatus of FIG. 10.

FIGS. 10-11 show another exemplary crop harvesting apparatus 100' that may be used to retrieve crops from plants and direct them to an embodiment of the cart assembly 1. The crop harvesting apparatus 100' includes a vacuum source 102' and a crop sorter 104' in connection with the vacuum source 102'. The crop sorter 102' is configured to sort crops based on at least one criterion (e.g., a type, a size, a color, a hue, a ripeness, insect infestation, presence of fungi, presence of bacteria, and presence of spots or discoloration of crops or plants associated with the crops). The crop harvesting apparatus 100' includes an end-effector 106' having an end-effector nozzle with an opening. A flexible tube 109 is provided for facilitating connection of the end-effector 106' to the crop sorter 104'. The flexible tube 109 has a smooth inner surface. The crop harvesting apparatus 100' includes a garnering camera 110' configured to collect information related to the at least one criterion and generate garnering crop criteria data. The crop harvesting apparatus 100' includes a sorting camera configured to collect information related to the at least one criterion and generate sorting crop criteria data. The crop harvesting apparatus 100' includes an actuating system 134 configured to support and position the end-effector 106'.

A control module 112' is included with the crop harvesting apparatus 100', and is configured to receive and analyze the garnering crop criteria data and the sorting crop criteria data to identify crops meeting the at least one criterion and crops not meeting the at least one criterion, the at least one criterion being any one or combination of a type, a size, a color, a hue, a ripeness, insect infestation, presence of fungi, presence of bacteria, and presence of spots or discoloration of crops or plants associated with the crops. The control module 112' is configured to perform a first examination using the garnering crop criteria data to determine whether crops meet the at least one criterion or not meet the at least one criterion. Based on the first examination, the control module 112' causes the crop harvesting apparatus 100' to selectively garner crops from a plant through the end-effector 106'. The control module 112' is configured to perform a second examination using the sorting crop criteria data to determine whether the garnered crops meet the at least one criterion or not meet the at least one criterion. Based on the second examination, the control module 112' causes the crop harvesting apparatus 100' to generate a first path or a second path for the garnered crops. The first path is an acceptance path designated for garnered crops that meet the at least one criterion. The second path is a rejection path designated for garnered crops that do not meet the at least one criterion.

The crop sorter 104' includes a conduit structure by which the first path is generated to facilitate movement of the garnered crops from the end-effector 106' into a hopper 111. The second path is generated by a portion of the conduit structure that facilitates movement of the garnered crops from the end-effector 106' into a reject bin 135.

The crop sorter 104' includes a plurality of gates 138 located within the conduit structure. The plurality of gates 138 comprises a first gate 138, a second gate 138, and a third gate 138. The first gate 138 selectively provides fluid communication between the crop sorter 104' and the hopper 111. The second gate 138 selectively provides fluid communication between the crop sorter 104' and the end effector 106'. The third gate 138 selectively provides fluid communication between the crop sorter 104' and an outlet. In an exemplary embodiment, the first path includes the portion of the conduit structure from the end-effector 106' to the hopper 111. The second path includes the portion of the conduit structure from the end-effector 106' to the reject bin 135.

In some embodiments, the control module 112' is configured to generate the first path via a first operational stage and a second operational stage. During the first operational stage: the vacuum source 102' generates suction, and the second gate 138 is open to provide the generated suction at the end-effector nozzle opening and to facilitate garnering crops from the plant through the end-effector 106'. As soon as the crop passes a break beam 136, a second operational stage is initiated where the second gate 138 is closed. The third gate 138 is open to allow airflow to the vacuum source 102' to prevent overheating. The first gate 138 opens to allow gravity and momentum of the crop to cause the crop to fall into the hopper 111.

The crop sorter 104' is in connection with the vacuum source 102', and is configured to sort crops based on at least one criterion. The crop sorter 104' moves crops either in path one or path two. Path one ends inside the hopper 111, which is connected to a conveyor 113 that transfers the tomatoes to the cart assembly 1. Path two ends in the reject bin 135. The description of the crop harvesting apparatus 100 described above and illustrated in FIGS. 10-11 is exemplary only. Other crop harvesting apparatuses and configurations can be used.

It should be understood that modifications to the embodiments disclosed herein can be made to meet a particular set of design criteria. For instance, the number of components or elements can be any suitable number of each to meet a particular objective. The particular configuration of type of such components or elements can also be adjusted to meet a particular set of design criteria. Therefore, while certain exemplary embodiments of the apparatuses and methods of making and using the same have been discussed and illustrated herein, it is to be distinctly understood that the invention is not limited thereto but may be otherwise variously embodied and practiced within the scope of the following claims.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

What is claimed is:

1. An automated packing cart assembly, comprising:
    a cart including a lower deck, vertical supports, and an upper deck forming a space within which containers are held, the lower deck including an empty-container staging area and a filled-container staging area;
    a gantry secured to the upper deck, the gantry including a gripper system configured to releasably grab a container;
    a control module configured to:
        cause the gripper system to retrieve the container from the empty-container staging area and transport it to a receiving site to receive an object in the container;
        determine when the container is filled; and
        transport the filled container to the filled-container staging area,
    wherein the control module is configured to actuate the vertical motion servo and/or the horizontal motion servo in a repeated manner to cause the gripper system to oscillate in a vertical and/or horizontal movement while the gripper system has a container and the container is positioned in the receiving site.

2. The automated packing cart assembly of claim 1, wherein the object is a crop.

3. The automated packing cart assembly of claim 2, further comprising:
    a crop harvesting apparatus configured to retrieve crops from plants and direct them to the container that is within the receiving site.

4. The automated packing cart assembly of claim 1, further comprising:
    wheels attached to the cart.

5. The automated packing cart assembly of claim 4, further comprising a means of propulsion.

6. The automated packing cart assembly of claim 4, wherein the wheels are flanged track wheels.

7. The automated packing cart assembly of claim 1, wherein the lower deck, the vertical supports, and the upper deck are constructed of connectable subparts.

8. The automated packing cart assembly of claim 1, wherein the gantry includes a vertical motion servo and a horizontal motion servo, each in electro-mechanical association with the gripper system via the control module to cause the gripper system to move in a vertical motion and/or a horizontal motion.

9. The automated packing cart assembly of claim 1, wherein:
    the gripper system includes a first gripper arm and a second gripper arm configured to secure the container between each other.

10. The automated packing cart assembly of claim 1, wherein the gripper system includes a load cell configured to measure the weight of the container when the container is grabbed by the gripper system and hoisted so as to be suspended by the gripper system.

11. The automated packing cart assembly of claim 9, wherein the gripper system includes a positon sensor to assess the position of the gripper system and/or the first and second gripper arms relative to the container.

12. An automated packing cart assembly, comprising:
    a cart including a lower deck, vertical supports, and an upper deck forming a space within which containers are held, the lower deck including an empty-container staging area and a filled-container staging area;
    a gantry secured to the upper deck, the gantry including a gripper system configured to releasably grab a container;
    a control module configured to:
        cause the gripper system to retrieve the container from the empty-container staging area and transport it to a receiving site to receive an object in the container;

determine when the container is filled; and transport the filled container to the filled-container staging area, wherein the gantry includes a vertical motion servo and a horizontal motion servo, each in electro-mechanical association with the gripper system via the control module to cause the gripper system to move in a vertical motion and/or a horizontal motion, and wherein the control module is programmed to execute a homing procedure, in which, upon the automated packing cart assembly experiencing a reset, a system fault, or is powered-on after being powered-off, each of the vertical motion servo and the horizontal motion servo is moved to an initializing point.

13. The automated packing cart assembly of claim 12, wherein the initializing point is the receiving site.

14. The automated packing cart assembly of claim 12, wherein the homing procedure includes, as the initializing point, the first griper arm and the second gripper arm being moved away from each other to generate a space between each other that is wider than a width of the container.

15. The automated packing cart assembly of claim 8, wherein the gripper system includes a positon sensor to determine a vertical position and/or a horizontal position of the griper system relative to the lower deck and/or the upper deck.

16. The automated packing cart assembly of claim 10, wherein the control module is programmed to execute a weighing procedure that assesses the weight measured by the load cell to determine whether enough objects have been received by the container, and designates the container as filled based on the assessment.

17. The automated packing cart assembly of claim 16, wherein the weighing procedure uses a threshold weight value that, when reached, causes the control module to designate the container as being filled.

18. The automated packing cart assembly of claim 17, wherein the threshold weight value for one type of object differs from the threshold weight for another type of object.

19. The automated packing cart assembly of claim 12, wherein the control module is configured to actuate the vertical motion servo and/or the horizontal motion servo in a repeated manner to cause the gripper system to oscillate in a vertical and/or horizontal movement while the gripper system has a container and the container is positioned in the receiving site.

20. The automated packing cart assembly of claim 12, wherein the gripper system includes a load cell configured to measure the weight of the container when the container is grabbed by the gripper system and hoisted so as to be suspended by the gripper system.

* * * * *